United States Patent [19]

Aylor

[11] Patent Number: 4,771,924

[45] Date of Patent: Sep. 20, 1988

[54] APPARATUS FOR WATERING ELEVATED PLANTS

[76] Inventor: Robyn A. Aylor, 9502 Bluewing Ter., Blue Ash, Ohio 45241

[21] Appl. No.: 36,983

[22] Filed: Apr. 10, 1987

[51] Int. Cl.$^4$ ................................................ B67D 5/00
[52] U.S. Cl. ...................................... 222/174; 239/377
[58] Field of Search ............... 222/166, 174, 164, 165; 239/375, 376, 377, 532, 280; 47/48.5

[56] References Cited

U.S. PATENT DOCUMENTS

| | | | |
|---|---|---|---|
| 370,004 | 9/1887 | Bruner | 222/174 X |
| 506,312 | 10/1893 | Fleming et al. | 222/174 X |
| 956,883 | 5/1910 | Brown | 222/174 X |
| 1,078,005 | 11/1913 | Skanks | 222/174 X |
| 1,473,852 | 11/1923 | Harrell | 222/174 X |
| 4,248,360 | 2/1981 | Crump | 239/532 X |

FOREIGN PATENT DOCUMENTS

| | | | |
|---|---|---|---|
| 19661 | of 1904 | United Kingdom | 222/174 |
| 953785 | 4/1964 | United Kingdom | 239/377 |

Primary Examiner—Kevin P. Shaver
Attorney, Agent, or Firm—Robert B. Aylor

[57] ABSTRACT

A device for watering elevated plants has a small container for holding water mounted on a support structure so as to be rotatable in a vertical plane. The support structure is at the end of a stick which can be used to elevate the small container when it is filled with water. The device also has a rope which is attached to the small container and which runs up and over said support structure and down to the end of the stick so that a pull on the rope will tip the container to water plants.

10 Claims, 1 Drawing Sheet

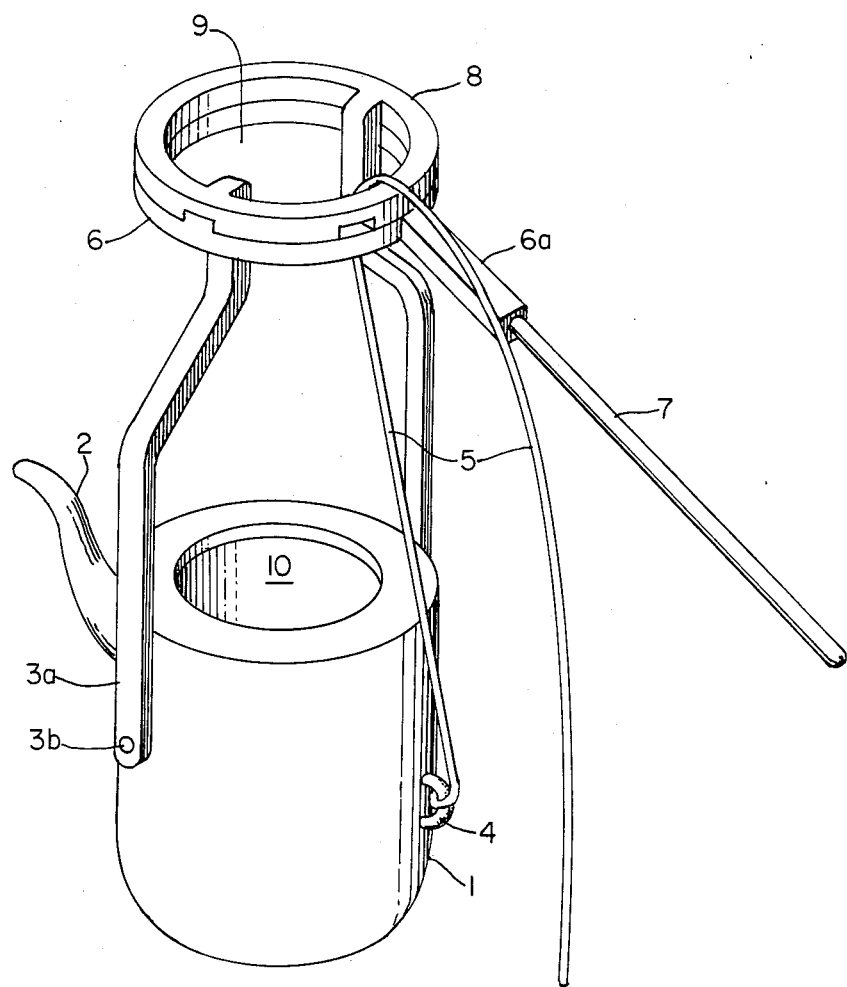

APPARATUS FOR WATERING ELEVATED PLANTS

BACKGROUND OF THE INVENTION

Many plants are placed so that they are elevated above a convenient height for hand watering. The usual watering process involves climbing, e.g., using a ladder, to permit watering. This can be dangerous and is inconvenient.

Known elaborate watering systems for elevated plants involve running hoses up to the required level. However, there has been a need for a simple, convenient way to water individual containers of plants that are sitting, or hanging, at elevated levels.

SUMMARY OF THE INVENTION

This invention provides a device for watering elevated plants comprising a small container for holding water mounted so as to be rotatable in a vertical plane at the end of a stick that is used to elevate the water and means, typically a rope, string, or chain for tipping the container to water the plant. The FIGURE is a semi-oblique drawing of a representative device.

DETAILED DESCRIPTION OF THE INVENTION

In a typical embodiment a device shown in the FIGURE comprises: a container (1) with an optional, but extremely desirable, spout (2); a first, e.g., "bail" support means; means for applying a force to the container comprising an attachment (4) and a flexible, elongated rope-like means for transferring force (5) to tip the container. Said first support means preferably comprises a bail (3a) and an axle (3b) which can be fixed with respect to either the bail (3a), or the container (1) to permit rotation of the container in a vertical plane, the bail (3a) being either integral with, or supported by, a second support means (6) that, in turn, can either be part of the pole (7), as shown, used to elevate the container (1) or can be removable with respect to the pole (7) although that is not specifically shown in the FIGURE. That is to say, the support (6a) and the pole (7) can be mated, preferably by means of screw threads. The screw threads in the support means (6a) allow attachment to a conventional handle (7) such as is used with e.g., paint rollers.

In the FIGURE the second support means (6) comprises a movable portion (8) which can be rotated with respect to both the pole (7) and the second support means (6). A desirable feature of the split support means (6) and (8) is the central hole (9) which permits filling the container (1) without detaching it. The support means (6) should be at an angle to the line of the pole, e.g., bent from about 15° to about 60° to keep the top of the support means relatively horizontal when the device is in use. Preferably the angle that the top of the support means is bent from an upward extension of the line of the pole is from about 30° to about 45°.

The flexible, elongated rope-like means (5) is usually a rope or string which is attached to the container (1) at, e.g., container attachment (4) and runs up and over some structure, conveniently either the second support means (6) and/or (8), or some other additional structure added to the device such as a hook or eye that is higher than the container attachment means (4) to convert the downward force on the lower (pole) end of the, e.g., rope (5) into an upward force on the terminal end of the rope (5) and thereby to the attachment means (4).

This relatively simple structure permits the casual gardener to water elevated plants with greatly reduced risk of injury by falling and without having to secure e.g., a ladder each time.

The container (1) is conveniently made of plastic, but can be made of metal or any other convenient material. It should have a small spout (2) for controlling the flow and an entrance (opening) (10) that is large enough to allow easy filling. The container can have a closure, especially for the opening (10) to minimize accidental spills.

The first support means is attached to the container (1) above the center of gravity of the container when it is filled, but preferably not so high as to make the force necessary to tip the container too great. The container attachment (4) should be low to allow almost complete emptying of the container (1). The container (1) should preferably have less than about a gallon capacity and more preferably less than about a quart capacity for convenient use. A desirable feature is to have the container (1) be transparent or translucent with markings indicating the volume of liquid.

The first support means (3b) and (3a) can comprise an axle as shown, or two hooks, or inwardly directed circular protrusions that can match into indentations in the container (1) so that the container (1) can be rotated in a vertical plane and tipped. The second support means (6) supports the first support means which is a bail for the container (1) and can be integal with or attached to the first support means in any convenient way. The illustrated preferred structure allows movement between the two parts of the second support means (6) and (8), e.g., horizontal rotation of (8) which facilitates positioning the spout (2) for pouring to either right, left, backwards or forwards. Preferably, as shown by partial illustration, the two parts (6) and (8) having interlocking "teeth" that permit locking the moveable portion (8) with respect to the fixed portion (6) after rotation.

What is claimed is:

1. A device for watering elevated plants, comprising: a container for water having a capacity of less than a gallon, a filling opening at the top of said container, and a spout on the container; a pole; a support structure for said container at the end of said pole, said support structure being disposed above said container and comprising: (a) a first portion that is fixed with respect to said pole, (b) a second portion that comprises a bail support means pivotally attached to said container so as to permit pivoting movement of said container, and (c) a central opening in said first and second portions that permits pouring water through said support structure into said container through said filling opening; and a flexible rope-like means for tilting said container, said rope-like means being attached to said container and passing up through said central opening and down along said pole, wherein a downward force on a lower end of said flexible rope-like means provides an upward force for pivoting said container to pour water onto plants.

2. A device according to claim 1 wherein the capacity of said container is less than one quart.

3. A device according to claim 1 wherein said first portion is removably attached to said pole.

4. A device according to claim 1 wherein said first portion is integral with said pole.

5. A device for watering elevated plants, comprising: a container for holding water having a capacity of less than a gallon, a filling opening at the top of said container, and a spout on the container; a pole; a support structure for said container at the end of said pole, said support structure being disposed above said container and at an angle of from about 15° to about 60° from the axis of the pole and comprising: (a) a bail support means pivotally attached to said container for permitting said container to pivot and (b) a support ring connected to said bail support means and defining a central opening that permits water to be poured therethrough into said container through said filling opening; and a flexible rope-like means for tilting said container, said rope-like means being attached to said container and passing up through said central opening and down along said pole, wherein a downward force on a lower end of said flexible rope-like means provides an upward force for tilting said container to pour water onto plants.

6. A device according to claim 5 wherein said support ring is removably attached to said pole.

7. A device according to claim 5 wherein said support ring is integral with said pole.

8. A device according to claim 5 wherein said container, said bail support means and said support ring are plastic.

9. A device according to claim 8 wherein said support ring is removably attached to said pole.

10. A device according to claim 8 wherein said support ring is integral with said pole.

* * * * *